May 7, 1963  J. C. BARKER ET AL  3,088,296
MARINE DRIVE
Filed Nov. 23, 1960  3 Sheets-Sheet 1

INVENTOR
JERRY C. BARKER
JOHN W. ANDERSON
BY *Fragno & Stone*
ATTORNEY

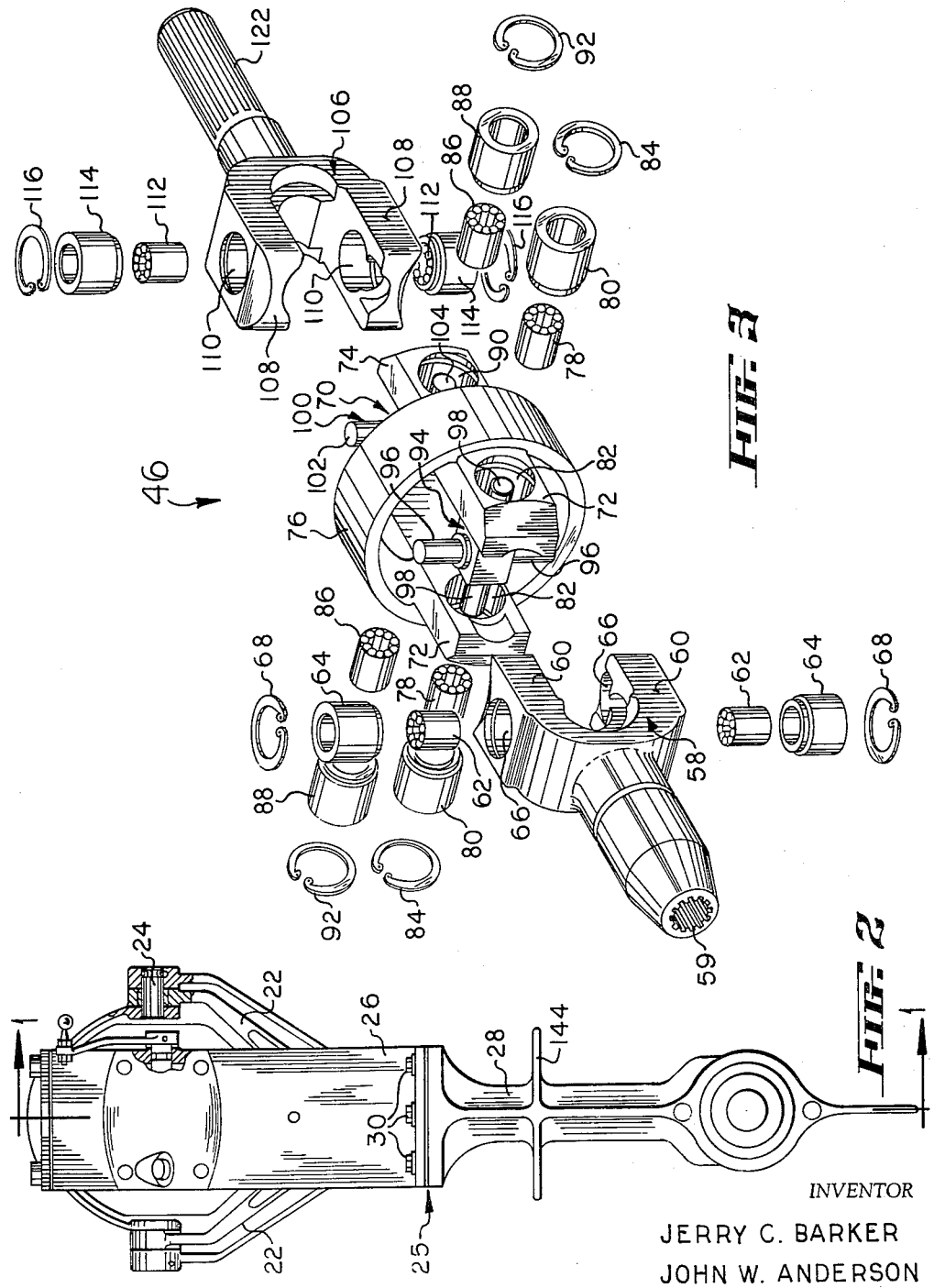

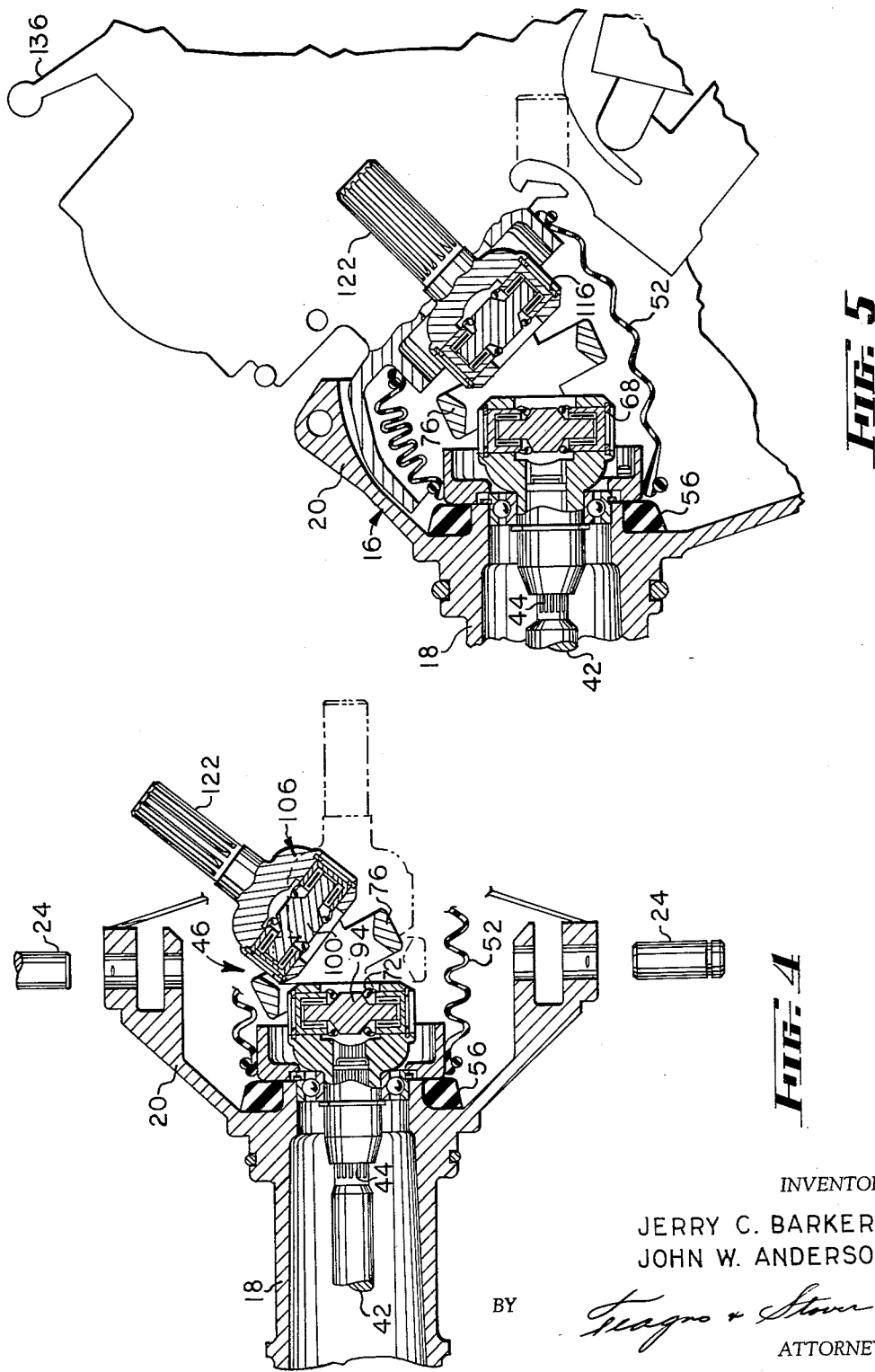

3,088,296
MARINE DRIVE
Jerry C. Barker, 8046 Fairway Drive, Seattle 15, Wash., and John W. Anderson, 2722 SW. 164th Place, Seattle 66, Wash.
Filed Nov. 23, 1960, Ser. No. 71,289
2 Claims. (Cl. 64—17)

This invention relates to an improved universal joint structure to be used in the environment of an inboard-outboard type marine propulsion unit.

A principal object of this invention is to provide a universal joint assembly which will allow an outboard power leg to be tilted-up or kicked-up due to striking an object and still maintain a driving relationship between a prime mover and a propeller on the outboard power leg.

A further object of this invention is to provide a universal joint structure which will allow an outboard power leg to be steered, that is, to be moved to a selected steering position with respect to the boat and still maintain a driving relationship between the prime mover and the outboard power leg.

Another object of this invention is to allow the input and output shaft portions of the universal joint structure to be moved to a severe working angle without having any structural interference in the universal joint structure.

Yet another object is to provide a universal joint structure which allows for a severe angle between the input and output shafts and yet maintain the minimum overall axial length of the universal joint assembly.

Still another object is to provide a universal joint structure which has maximum structural rigidity and strength without adversely affecting the maximum angular relationship which is obtainable between the input and output shafts of the universal joint assembly.

These and other objects and advantages will become more apparent from the following detailed description of the device and from the accompanying drawings wherein:

FIGURE 2 is a rear elevational view of the outboard power leg shown in cross-section in FIGURE 1.

FIGURE 3 is an exploded view of the universal joint assembly disclosed herein.

FIGURE 4 is a partial cross-sectional view taken along 4—4 of FIGURE 1 but modified to show the universal joint in an extreme steering position.

FIGURE 5 is a cross-sectional view illustrating a portion of the structure shown in FIGURE 1 but modified to show the universal joint assembly in an extreme kicked-up position.

Figure 1:
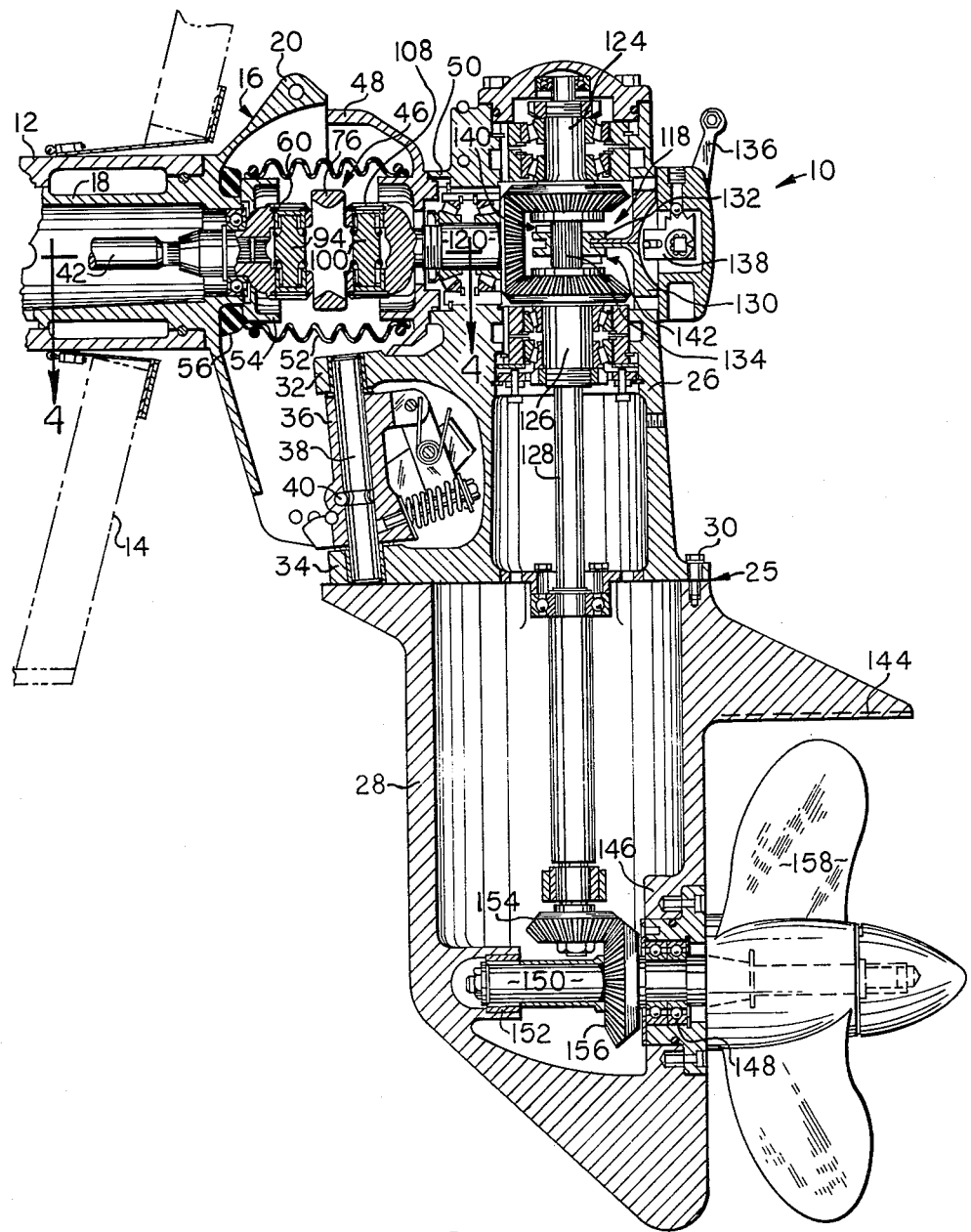
FIGURE 1 is a cross-sectional side view of an outboard power leg utilizing the novel universal joint assembly disclosed herein taken along section 1—1 of FIGURE 2.

Referring to the drawing for a detailed description of the device, FIGURES 1 and 2 illustrate an outboard power leg 10 supported in a mounting support sleeve 12 which is in turn structurally connected with a prime mover (not shown) or to the keel (not shown) and/or the transom 14 of a boat. A forward joint housing 16 is comprised of a sleeve portion 18 supported internally of mounting support sleeve 12 and a rearwardly disposed open-faced portion 20 which provides a mounting and support means for vertically intermediate support means or pivotal yoke 22. Yoke support pins 24 are carried by forward joint housing portion 20 in a manner to allow yoke 22 to vertically pivot about a horizontal axis defined by pins 24.

A power leg housing assembly 25 is comprised of a power leg upper housing 26 and a power leg lower housing 28 connected thereto by a plurality of bolts 30. A power leg upper supporting arm 32 is vertically spaced from a power leg lower supporting arm 34 and each of these power legs supporting arms is formed integrally with upper housing 26. A bearing support collar 36 is formed as a part of and structurally connects yoke 22 at the lower end portion of the arms of the yoke. A bearing support shaft 38 is longitudinally locked in bearing support collar 36 by a locking pin 40 so that end portions of bearing support shaft 38 are utilized as mounting means for the upper and lower supporting arms 32 and 34. With this arrangement, power leg housing assembly 25 is rotatable about the axis of bearing support shaft 38. The aforementioned assembly provides the basic structural parts to allow for kick-up and steering of the outboard power leg.

A prime mover driven power shaft 42 is provided with an externally splined end portion 44. A universal joint 46 is operably connected with power shaft 42 and will be hereinafter described in greater detail. A protective shell or rearward joint housing 48 is supported by power leg upper housing 26 at flanged ring portion 50 and is shaped so that when the power leg kicks up about yoke support pins 24, the peripheral portion of protective shell 48 will clear the inner arcuate surface of forward joint housing portion 20. A U-joint flexible protective boot 52 is supported at one end on a projecting ring portion of protective shell 48 and at the other end on a boot support ring 54 which is fixed to housing 16. A kick-up bumper 56 provides a resilient stop for the ring edge of shell 48 in an extreme kicked-up position.

Referring to FIGURE 3, a universal joint assembly 46 is comprised of a yoke 58 having an internally splined shaft portion 59 and a pair of yoke arms 60. A bearing assembly comprising needle bearing 62 and a bearing cup 64 is receivable in each of circular openings 66 in yoke arms 60. Snap rings 68 retain the bearings in assembled relationship with yoke arms 60. A universal joint hollow connecting ring 70 is comprised of a set of connecting ring yoke arms 72 and a further set of connecting ring yoke arms 74. Intermediate ring portion 76 of universal joint connecting ring 70 is of a cross-sectional shape to provide maximum ring strength and is shaped on the internal diametered portion to insure that proper clearance with be maintained at all times between the input and output yokes with respect to connecting ring 70 even when the universal joint assembly is in an extreme kicked-up or steering position. A bearing assembly comprising a needle bearing 78 and a bearing cup 80 is receivable in each of circular openings 82 disposed in connecting ring yoke arms 72. Snap rings 84 retain each of these bearing assemblies in an assembled position in yoke arms 72. Similar bearing assemblies 86, 88 are receivable in the circular openings 90 of connecting ring yoke arms 74 and are retained in an assembled position by snap rings 92. A universal joint spider 94 is provided with a first pair of diametrically opposed spider pins 96 which are receivable in bearing assemblies 62, 64 and a second pair of spider pins 98 receivable in bearing assemblies 78, 80 to thereby form a universal joint which drivingly connects ring 70 with yoke 58 for universal movement therebetween. A similar spider 100 is provided with a first set of diametrically opposed spider pins 102 and a second set of spider pins 104. Spider pins 104 are receivable in bearing assemblies 86, 88. A yoke 106 is provided with a pair of yoke arms 108 having circular openings 110 therein to receive a bearing assembly comprising needle bearing 112 and bearing cup 114 in each of openings 110. Snap rings 116 retain bearing assemblies 112, 114 in each of the openings 110. This structural arrangement provides a universal connection between yoke 106 and universal joint connecting ring 70.

A forward-reverse gearing assembly 118 is comprised of an input bevel gear 120 internally splined (not shown) so as to be drivingly connected with yoke 106 at splined portion 122 of yoke 106. A pair of axially spaced tapered roller thrust bearings support the shaft portion of bevel gear 120 in power leg upper housing 26. A forward rotating upper output bevel gear 124 and a reverse rotating lower output bevel gear 126 are supported in power leg upper housing 126 by spaced tapered roller thrust bearings.

A reciprocable shifting plate 130 is slideably mounted in power leg upper housing 26 and has connected thereto a slideable clutch collar 132 which is splined to power output vertical shaft 128 at 134. A shift arm 136 is oscillatably mounted in power leg upper housing 26 and has connected to a shaft portion thereof a slotted crank 138 which receives a pin portion of shifting plate 130 so that when shift arm 136 is oscillated, slideable clutch collar 32 is alternately moved to a position adjacent either upper output bevel gear 124 or lower output bevel gear 126. Dog clutch assemblies 140 and 142 are provided between clutch collar 132 and bevel gear 124 and clutch collar 132 and bevel gear 126, respectively, so that when clutch collar 132 is in the upper position as shown in FIGURE 1, bevel gear 124 is splined to power output shaft 128 and when clutch collar 132 is in the lower position, lower bevel gear 126 is drivingly connected with power output shaft 128. Clutch collar 132 is illustrated in FIGURE 1 in the neutral position.

Power leg lower housing 28 is provided with an anticavitation plate 144 and a propeller shaft bearing support hub 146. A propeller shaft supporting bearing assembly 148 is supported in and connected to hub 146 and the bearing assembly in turn supports a propeller shaft 150 at the rearward end and a bushing 152 supports shaft 150 at the forward end. Bevel gears 154 and 156 are splined to power output shaft 128 and propeller shaft 150 respectively. A propeller 158 is mounted on and fixed for rotation with shaft 150.

Assuming that shift arm 136 is positioned so that dog clutch assembly 140 is engaged, power shaft 42 is rotated by the prime mover and in turn, rotates universal joint assembly 46, input bevel gear 120, forward output bevel gear 124, clutch collar 132, power output vertical shaft 128, bevel gear 154, bevel gear 156, propeller shaft 150 and propeller 158. When shift arm 136 is moved to the other extreme position, clutch collar 132 is connected with lower reverse output bevel gear 126 and power path is from input bevel gear 120, lower output bevel gear 126, slideable clutch collar 132, power output vertical shaft 128, etc.

An important novel aspect of the structure disclosed herein is the provision of universal joint assembly 46 and the novel design thereof which allows power leg 10 to kick-up to an extreme position on the order of as much as 60 degrees and also allows power leg 10 to be moved angularly to an extreme steering position of about 45 degrees to either side with respect to the axis of power shaft 42. This feature is obtained by the novel and unique design of universal joint connecting ring 70 and the assembled relationship of ring 70 with yokes 60 and 106. By arranging the ring 70 so that the hollow central portion is large enough to accommodate yokes 60 and 106 when the yokes are disposed at an extreme working angle with respect to each other, such as 60 degrees, the outboard power leg is free to move to an extreme angle with respect to the transom.

Assuming that shaft arm 136 is positioned so that dog clutch assembly 140 is engaged, power shaft 42 is rotated by the prime mover and in turn, rotates universal joint assembly 46, input bevel gear 120, forward output bevel gear 124, clutch collar 132, power output vertical shaft 128, bevel gear 154, bevel gear 156, propeller shaft 150 and propeller 158. When shift arm 136 is moved to the other extreme position, clutch collar 132 is connected with lower reverse output bevel gear 126 and power path is from input bevel gear 120, lower output bevel gear 126, slideable clutch collar 132, power output vertical shaft 128, etc.

An important novel aspect of the structure disclosed herein is the provision of universal joint assembly 46 and the novel design thereof which allows power leg 10 to kick-up to an extreme position on the order of as much as 60 degrees and also allows power leg 10 to be moved angularly to an extreme steering position of about 45 degrees to either side with respect to the axis of power shaft 42. This feature is obtained by the novel and unique design of universal joint connecting ring 70 and the assembled relationship of ring 70 with yokes 60 and 106. By arranging the ring 70 so that the hollow central portion is large enough to accommodate yokes 60 and 106 when the yokes are disposed at an extreme working angle with respect to each other, such as 60 degrees, the outboard power leg is free to move to an extreme angle with respect to the transom. Another important novel aspect of the universal joint assembly 46 is that spiders 94 and 100 can be positioned extremely close together because the connecting portion therebetween, namely, universal joint connecting ring 70 is disposed radially outward of yokes 16 and 106. This is an important feature because in the environment of an outboard power leg, it is very important and necessary to position the power leg as close to the transom of the boat as possible.

In summary, this structural arrangement of universal joint assembly 46 provides a very close coupled, double universal joint assembly and also allows for extreme angularity between the joints.

FIGURE 4 illustrates universal joint assembly 46 in an extreme steering angular position and is viewed from the top of the unit as positioned in FIGURE 1. In assuming the angular relationship shown in FIGURE 4, outboard power leg 10 is steered to the right, as viewed from above, about the axis of bearing support shaft 38. The included angle between the shaft portions of yoke 60 and yoke 106 in an extreme steering position can be as much as 45 degrees.

FIGURE 5 illustrates universal joint assembly 46 in a kick-up position. When the joint assembly assumes the angle shown in FIGURE 5, power leg 10 and yoke 22 are rotated with respect to forward joint housing 16 about the axis of yoke support pins 24. The included angle between the shaft portions of yoke 60 and yoke 106 in an extreme kick-up position can be much as 60 degrees.

It is apparent from the illustrations shown in FIGURES 4 and 5 that the total included angle between yokes 60 and 106 is actually equally divided between the two joints since universal joint connecting ring 70 assumes an angular position approximately half-way between the yokes 60 and 106. For example, when an extreme kick-up position is taken, as in FIGURE 5, each joint is disposed at an angle of about 30 degrees with respect to universal joint connecting ring 70 and the total included angle between the shaft portions of yokes 60 and 106 is double that amount or 60 degrees. With this novel arrangement, a severe steering angle can be taken at high engine torque and the effective condition on each of the joints is the same as would be experienced under similar load and speed conditions at half the effective angle.

While the present invention has been described in connection with certain specific embodiments, it is to be understood that the foregoing description is merely exemplary and the the concept of this invention is susceptible of numerous other modifications, variations and applications which will be apparent to persons skilled in the art. The invention is to be limited therefor only by the board scope of the appended claims.

We claim:
1. In an inboard-outboard type marine drive comprising an outboard power leg, a supporting member adapted to be connected to a structural portion of a boat, a forward joint housing carried by said supporting member, an intermediate support means pivotally mounted on said forward joint housing about a first axis, said outboard power leg being pivotally mounted on said intermediate support means about a second axis disposed normal to said first axis thereby allowing said power leg to be oscillated laterally for steering or pivoted upwardly for kick-up, a power shaft adapted to be connected at one end to a prime mover, a universal joint assembly, means connecting said power shaft for rotation with said universal joint assembly, a rearward joint housing carried by said power leg and disposed adjacent said forward joint housing, gearing and power transfer shaft means disposed in said power leg and being connected to said universal joint assembly for rotation therewith, said universal joint assembly comprising a first yoke connected with said power shaft, said first yoke having a pair of laterally spaced, oppositely disposed yoke arms, a second yoke connected with said gearing means, said second yoke having a pair of laterally spaced, oppositely disposed yoke arms, a connecting ring disposed axially intermediate said first and said second yokes, said connecting ring having a hollow central ring portion, a first set of laterally spaced, oppositely disposed yoke arms on said ring portion, means connecting said first set of yoke arms on said ring portion, with said yoke arms on said first yoke for universal motion therebetween, a second set of yoke arms on said ring portion, means connecting said second set of yoke arms on said ring portion with said yoke arms of said second yoke for universal motion therebetween, said first yoke and said second yoke being disposed within the axial confines of the assembly including said forward joint housing and said rearward joint housing, and said forward joint housing being positioned with respect to said rearward joint housing to allow said power leg to be kicked up to a position wherein said rearward joint housing is disposed partially within and in overlapping relationship with said forward joint housing while operating clearance is maintained between the universal joint assembly and said rearward joint housing.

2. A device according to claim 1 wherein the assembly including said forward joint housing and said rearward joint housing substantially exteriorly encloses said universal joint assembly.

References Cited in the file of this patent
UNITED STATES PATENTS

| | | |
|---|---|---|
| 1,774,679 | Swenson | Sept. 2, 1930 |
| 1,979,768 | Pearce | Nov. 6, 1934 |
| 2,042,513 | Daniell | June 2, 1936 |
| 2,303,180 | Swenson | Nov. 24, 1942 |
| 2,536,894 | Wanzer | Jan. 2, 1951 |
| 2,605,853 | Swenson | Aug. 5, 1952 |
| 2,837,051 | Friedrich | June 3, 1958 |